(12) United States Patent
Ise et al.

(10) Patent No.: US 8,137,810 B2
(45) Date of Patent: Mar. 20, 2012

(54) CARBON FIBER, PROCESS FOR PRODUCTION OF POLYACRYLONITRILE-BASE PRECURSOR FIBER FOR CARBON FIBER PRODUCTION, AND PROCESS FOR PRODUCTION OF CARBON FIBER

(75) Inventors: Masafumi Ise, Ehime (JP); Isao Nakayama, Ehime (JP); Makoto Endo, Ehime (JP)

(73) Assignee: Toray Industries, Inc. (JP)

( * ) Notice: Subject to any disclaimer, the term of this patent is extended or adjusted under 35 U.S.C. 154(b) by 876 days.

(21) Appl. No.: 12/097,277

(22) PCT Filed: Dec. 6, 2006

(86) PCT No.: PCT/JP2006/324343
§ 371 (c)(1),
(2), (4) Date: Jun. 13, 2008

(87) PCT Pub. No.: WO2007/069511
PCT Pub. Date: Jun. 21, 2007

(65) Prior Publication Data
US 2010/0143713 A1 Jun. 10, 2010

(30) Foreign Application Priority Data
Dec. 13, 2005 (JP) .................. 2005-359049

(51) Int. Cl.
*B32B 9/00* (2006.01)
*D02G 3/00* (2006.01)
*D01F 9/12* (2006.01)

(52) U.S. Cl. ........ 428/367; 428/364; 428/399; 428/397; 423/447.1; 423/447.2; 423/447.4; 423/447.6

(58) Field of Classification Search ............... 423/447.1, 423/447.6, 447.7, 447.8, 448; 264/29.2, 264/29.6, 29.7, 182; 428/367, 364, 372, 428/379, 400

See application file for complete search history.

(56) References Cited

U.S. PATENT DOCUMENTS

| | | | | | |
|---|---|---|---|---|---|
| 4,655,902 | A | * | 4/1987 | Izumi et al. ..................... 208/22 |
| 5,047,292 | A | * | 9/1991 | Sadanobu et al. ............. 428/367 |
| 5,269,984 | A | * | 12/1993 | Ono et al. ..................... 264/29.2 |
| 6,221,490 | B1 | * | 4/2001 | Matsuhisa et al. ............. 428/367 |
| 6,998,434 | B2 | * | 2/2006 | Wadahara et al. ............. 524/495 |

FOREIGN PATENT DOCUMENTS

| | | |
|---|---|---|
| JP | 63-42910 A | 2/1988 |
| JP | 2-84505 A | 3/1990 |
| JP | 3-180514 A | 8/1991 |
| JP | 11-241230 A | 9/1999 |
| JP | 2001-131833 A | 5/2001 |
| JP | 2003-73932 A | 3/2003 |
| JP | 2004-91961 A | 3/2004 |
| JP | 2004-156161 A | 6/2004 |
| JP | 2004-197278 A | 7/2004 |
| JP | 2004-238761 A | 8/2004 |

* cited by examiner

*Primary Examiner* — Elizabeth M. Cole
*Assistant Examiner* — Altrev Sykes
(74) *Attorney, Agent, or Firm* — DLA Piper LLP (US)

(57) ABSTRACT

A process for producing polyacrylonitrile-base precursor fibers for production of carbon fibers, which comprises spinning a spinning dope containing 10 to 25 wt % of a polyacrylonitrile-base polymer having an intrinsic viscosity of 2.0 to 10.0 by extruding the spinning dope from a spinneret by a wet spinning or a dry wet spinning method, drying and heat-treating fibers obtained by the spinning, and then steam drawing the resulting fibers, wherein the linear extrusion rate of the polyacrylonitrile-base polymer from the spinneret is 2 to 15 m/min. Carbon fibers which are produced by stabilizing-carbonizing treatment of the polyacrylonitrile-base precursor fibers and which have a strand tensile modulus of 320 to 380 GPa and a conduction electron density of $3.0 \times 10^{19}$ to $7.0 \times 10^{19}$ spins/g as determined by electron spin resonance.

3 Claims, No Drawings

CARBON FIBER, PROCESS FOR PRODUCTION OF POLYACRYLONITRILE-BASE PRECURSOR FIBER FOR CARBON FIBER PRODUCTION, AND PROCESS FOR PRODUCTION OF CARBON FIBER

RELATED APPLICATIONS

This is a §371 of International Application No. PCT/JP2006/324343, with an international filing date of Dec. 6, 2006 (WO 2007/069511 A1, published Jun. 21, 2007), which is based on Japanese Patent Application No. 2005-359049, filed Dec. 13, 2005.

TECHNICAL FIELD

This disclosure relates to carbon fibers excellent in compressive strength and tensile elastic modulus and a process for producing the same. Further, the disclosure relates to a process for producing polyacrylonitrile-base precursor fibers used for production of the carbon fibers.

BACKGROUND

Carbon fibers are used in various applications owing to their excellent mechanical properties and electric properties. The conventional applications of carbon fibers include sporting goods such as golf clubs and fishing rods and aircraft, and in recent years, in addition, carbon fibers are increasingly used in so-called general industrial applications as automobile members, compressed natural gas (CNG) tanks, aseismic reinforcing members of buildings and ship members. This tendency requires higher levels of mechanical properties. For example, in the aircraft application, many of the structural members are being replaced by carbon fiber reinforced plastics lighter in weight, and carbon fibers having both high compressive strength and high tensile elastic modulus are being demanded.

The industrial production of carbon fibers undergoes a stabilization step of heat-treating precursor fibers made of a polymer such as polyacrylonitrile in air with a temperature of 200 to 300° C. and a carbonization step of heat-treating the stabilized fibers obtained in the stabilization step in an inert atmosphere with a temperature of 300 to 3,000° C. In general, if the highest temperature in the carbonization step is higher, the tensile elastic modulus of the obtained carbon fibers can be made higher, but since graphite crystals grow, the compressive strength of the obtained carbon fibers decline. That is, there is trade-off relation between the tensile elastic modulus and the compressive strength of carbon fibers. To overcome the trade-off relation, several techniques for enhancing the compressive strength and the tensile elastic modulus have been proposed in addition to those for controlling the carbonization temperature.

Techniques proposed for enhancing the compressive strength of carbon fibers include, for example, a technique of implanting ions into carbon fibers, for making graphite crystals amorphous and a technique of using precursor fibers with a non-circular cross sectional form for increasing the geometrical moment of inertia (see JP 3-180514 A and JP 3-185121 A). However, the former proposal allows carbon fibers to be treated only little by little in high vacuum, and the latter proposal has a problem in view of uniformity of final products, since it is difficult to maintain the sectional form stably. Both the proposals involve difficulty in industrial application.

To enhance the tensile elastic modulus of carbon fibers, as is known, it is effective to draw fibers at the time of stabilizing-carbonizing treatment, for enhancing the orientation degree of carbon fibers. However, merely enhancing the draw ratio causes fuzz generation and fiber breakage, and it cannot be avoided that the production stability and the grade of the obtained carbon fibers decline. Techniques for stabilizing drawing by controlling stabilizing-carbonizing treatment conditions are also proposed (see JP 2004-91961 A and JP 2004-197278 A). However, the drawing level achieved is not satisfactorily high, while the effect of enhancing the tensile elastic modulus by drawing is slight.

A technique for enhancing oxygen permeability of the precursor fibers to be used and homogenizing reaction among the single filaments in the stabilization step, to thereby enhancing the tensile elastic modulus of the obtained carbon fibers, is proposed (see JP 2-84505 A). However, this proposal has a problem that, since as much as more than 1.5% of a comonomer is used for enhancing the oxygen permeability, the heat resistance of the precursor fibers declines, though the effect of enhancing the tensile elastic modulus can be certainly obtained. The decline of heat resistance causes more single filaments to adhere to each other in the drying heat treatment step or the steam drawing step of the fiber producing step, and in the stabilizing or carbonizing in the stabilizing-carbonizing treatment step, to lower the production stability and the tensile strength and compressive strength of the obtained carbon fibers.

It could therefore be helpful to provide carbon fibers excellent in both compressive strength and tensile elastic modulus without impairing productivity and processability, and also to provide a production process thereof. It could also be helpful to provide a process for producing polyacrylonitrile-base precursor fibers used for production of the carbon fibers.

We obtain carbon fibers by spinning a polyacrylonitrile-base polymer and subsequently using a stabilizing-carbonizing treatment so that the carbon fibers have a strand tensile modulus of 320 to 380 GPa and a conduction electron density of $3.0 \times 10^{19}$ to $7.0 \times 10^{19}$ spins/g as determined by electron spin resonance.

In the carbon fibers, it is preferred that the strand tensile modulus is 330 to 380 GPa and that the conduction electron density as determined by electron spin resonance is $4.0 \times 10^{19}$ to $7.0 \times 10^{19}$ spins/g.

In the carbon fibers, it is preferred that the crystal size of the carbon fibers is 1.8 to 2.6 nm.

In the carbon fibers, it is preferred that the specific gravity of the carbon fibers is 1.75 to 1.85.

In the carbon fibers, it is preferred that the average single filament diameter of the carbon fibers is 4.5 to 7.5 μm.

The process for producing polyacrylonitrile-base precursor fibers for production of carbon fibers for achieving the abovementioned objects, which comprises spinning a spinning dope containing 10 to 25 wt % of a polyacrylonitrile-base polymer having an intrinsic viscosity of 2.0 to 10.0 by extruding it from a spinneret by a wet spinning or dry wet spinning method, drying and heat-treating the fibers obtained in the spinning step, and steam-drawing the fibers obtained, wherein the linear extrusion rate of the polyacrylonitrile-base polymer from the spinneret is 2 to 15 m/min.

In the process for producing polyacrylonitrile-base precursor fibers for production of carbon fibers, it is preferred that the linear extrusion rate is 2 to 10 m/min.

In the process for producing polyacrylonitrile-base precursor fibers for production of carbon fibers, it is preferred that the spinning method is a dry wet spinning method.

In the process for producing polyacrylonitrile-base precursor fibers for production of carbon fibers, it is preferred that the melting point Tm in wet heat of the polyacrylonitrile-base polymer measured by a differential scanning calorimeter is 186 to 200° C.

In the process for producing polyacrylonitrile-base precursor fibers for production of carbon fibers, it is preferred that the polyacrylonitrile-base polymer is a copolymer containing a component copolymerizable with acrylonitrile and that the amount of the copolymerizable component is 0.1 to 0.5 mol %.

In the process for producing polyacrylonitrile-base precursor fibers for production of carbon fibers, it is preferred that the single filament fineness of the polyacrylonitrile-base precursor fibers for production of carbon fibers is 0.7 to 1.0 dtex.

The process for producing carbon fibers comprises stabilizing the polyacrylonitrile-base precursor fibers for production of carbon fibers, produced by the process for producing polyacrylonitrile-base precursor fibers for production of carbon fibers, in air with a temperature of 200 to 300° C., while drawing them at a draw ratio of 0.80 to 1.20, preliminarily carbonizing the fibers obtained in an inert atmosphere with a temperature of 300 to 800° C., while drawing them at a draw ratio of 1.00 to 1.30, and carbonizing the fibers obtained in an inert atmosphere with a temperature of 1,000 to 2,000° C., while drawing them at a draw ratio of 0.96 to 1.05.

In the process for producing carbon fibers, it is preferred that the draw ratio in the stabilization step is 0.90 to 1.20, that the draw ratio in the preliminary carbonization step is 1.10 to 1.30, and that the draw ratio in the carbonization step is 0.97 to 1.05.

If the polyacrylonitrile-base precursor fibers for production of carbon fibers, produced by the process for producing polyacrylonitrile-base precursor fibers for production of carbon fibers are used, fibers can be drawn highly and stably in the carbon fiber production process without impairing the productivity and processability of the carbon fiber production process. As a result, carbon fibers excellent in compressive strength and tensile modulus, and excellent further in tensile strength and grade can be produced at low cost.

DETAILED DESCRIPTION

We found that the polyacrylonitrile-base precursor fibers for production of carbon fibers, produced by extruding, for spinning, a spinning dope containing a polyacrylonitrile-base polymer with its intrinsic viscosity kept in a specific range at any polymer concentration in a specific range, from a spinneret at any linear extrusion rate in a specific range, can be highly drawn in the stabilizing-carbonizing treatment step for producing carbon fibers.

We found that the breakage of fibers at the time of drawing in the stabilizing-carbonizing treatment step for producing carbon fibers can be inhibited, first by enhancing the intrinsic viscosity, namely, raising the molecular weight, to thereby make the molecular chains longer while intensifying the inter-molecular connections in the fiber axis direction, second by controlling the polyacrylonitrile-base polymer concentration of the spinning dope, to intensify the inter-molecular entanglement, namely, the inter-molecular connections, and third by controlling the linear extrusion rate of the spinning dope from the spinneret, to form fibers from the spinning dope without loosening the inter-molecular entanglement.

Further, we found that, if the strand tensile modulus and the conduction electron density determined by electron spin resonance are controlled in specific ranges, carbon fibers having both a high level of tensile modulus and a high level of compressive strength can be obtained. The carbon fibers can be obtained by stabilizing-carbonizing treatment of the fibers obtained by spinning a polyacrylonitrile-base polymer. The obtained carbon fibers have a strand tensile modulus of 320 to 380 GPa and a conduction electron density of $3.0 \times 10^{19}$ to $7.0 \times 10^{19}$ spins/g as determined by electron spin resonance (hereinafter may be abbreviated as ESR).

It is highly preferred that the strand tensile modulus of carbon fibers is 320 to 380 GPa. A more preferred strand tensile modulus range is 330 to 380 GPa. A further more preferred strand tensile modulus range is 340 to 370 GPa. It is preferred that the strand tensile modulus of carbon fibers is higher, since the tensile modulus and the compressive modulus of the obtained composite can be enhanced. If the strand tensile modulus is smaller than 320 GPa, it is difficult to apply the carbon fibers to a region where stiffness is required in aircraft application, etc. On the other hand, the carbon fibers with a strand tensile modulus of higher than 380 GPa are difficult to produce even if the process for producing carbon fibers of the invention is applied.

The strand tensile modulus can be controlled mainly by the carbonization temperature of precursor fibers and the draw ratio at the time of stabilizing-carbonizing treatment. If the carbonization temperature is higher, the strand tensile modulus can be made higher, but it should be noted that since the crystal size of carbon fibers becomes large simultaneously, it is difficult to exhibit high compressive strength. For enhancing the strand tensile modulus while controlling the crystal size of carbon fibers in a specific range, how to enhance the draw ratio at the time of stabilizing-carbonizing treatment is important.

It is highly preferred that the carbon fibers have a conduction electron density of $3.0 \times 10^{19}$ to $7.0 \times 10^{19}$ spins/g as determined by electron spin resonance (ESR). A more preferred conduction electron density range is $4.0 \times 10^{19}$ to $7.0 \times 10^{19}$ spins/g, and a further more preferred conduction electron density range is $4.2 \times 10^{19}$ to $6.6 \times 10^{19}$ spins/g. The conduction electron density measured by ESR corresponds to the amount of conjugated bonds in the crystals of carbon fibers and, if this value is higher, the graphite network faces develop well to reflect high two-dimensionality.

Compared with the conventional carbon fibers having a strand tensile modulus of 320 to 380 GPa, the carbon fibers are characteristically low in the conduction electron density and high in three-dimensionality. Since the high three-dimensionality inhibits the microbuckling failure of graphite crystals at the time of compression, the compressive strength of carbon fibers can be enhanced. If the conduction electron density is lower than $3.0 \times 10^{19}$ spins/g, two-dimensionality declines so much as to lower the strand tensile modulus. Further, if the conduction electron density is higher than $7.0 \times 10^{19}$ spins/g, three-dimensionality declines so much as not to provide a clear effect of enhancing the compressive strength of carbon fibers.

The conduction electron density can be controlled by the molecular weight of the polyacrylonitrile-base polymer used for producing the polyacrylonitrile-base precursor fibers for production of carbon fibers, the polymer concentration of the spinning dope, the linear extrusion rate of the spinning dope extruded from the spinneret, further the carbonization temperature for stabilizing-carbonizing treatment of the polyacrylonitrile-base precursor fibers for production of carbon fibers, for producing carbon fibers.

The conduction electron density can be lowered by enhancing the molecular weight of the polyacrylonitrile-base polymer and the polymer concentration and lowering the linear extrusion rate. Further, the conduction electron density can also be lowered by enhancing the carbonization temperature. However, as described before, if the carbonization temperature is changed, the strand tensile modulus of carbon fibers and the crystal size of carbon fibers are also changed. For obtaining the carbon fibers, it is important to control the conduction electron density by any other method than changing the carbonization temperature.

It is preferred that the crystal size of the carbon fibers is 1.8 to 2.6 nm. A more preferred range is 1.9 to 2.5 nm, and a further more preferred range is 2.0 to 2.4 nm. If the crystal size of carbon fibers is smaller than 1.8 nm, a high strand tensile modulus may be unlikely to be exhibited. Further, if the crystal size of carbon fibers is larger than 2.6 nm, there arises a problem that the compressive strength declines. The crystal size of carbon fibers can be controlled by the carbonization temperature.

It is preferred that the specific gravity of the carbon fibers is 1.75 to 1.85. If the specific gravity of carbon fibers is lower than 1.75, the crystal structure of carbon fibers is insufficiently densified, and the strand tensile modulus is unlikely to be enhanced. Further, if the specific gravity is higher than 1.85, the crystal structure of carbon fibers becomes close to that of graphite, and there arises a problem that the compressive strength declines. The specific gravity can be controlled by adjusting the stabilization treatment time, the draw ratio in the stabilizing-carbonizing treatment step, the temperature rising rates in the preliminary carbonization step and the carbonization step, the temperature of the carbonization step, etc.

It is preferred that the average single filament diameter of the carbon fibers is 4.5 to 7.5 μm. If the average single filament diameter is smaller than 4.5 μm, there arises a problem that productivity declines due to single filament breakage during spinning and drawing. Further, if the average single filament diameter is larger than 7.5 μm, there arises a problem that the strand tensile modulus cannot be enhanced since the stabilization treatment inside the single filaments is insufficient. A preferred average single filament diameter range is 4.7 to 6.0 μm.

Next, the process for producing polyacrylonitrile-base precursor fibers for production of carbon fibers is explained below.

It is preferred that the polyacrylonitrile-base polymer used in the polyacrylonitrile-base precursor fibers for production of carbon fibers has an acrylonitrile content of at least 95 mol % or more and an intrinsic viscosity of 2.0 to 10.0. A more preferred intrinsic viscosity range is 2.3 to 8.0 and a further more preferred intrinsic viscosity range is 2.5 to 6.0.

In the case of a low molecular weight polyacrylonitrile-base polymer having an intrinsic viscosity of lower than 2.0, since the inter-molecular connections in the fiber axis direction decline, the ability to enhance drawability in the stabilizing-carbonizing treatment step decreases. Further, though a higher intrinsic viscosity is preferred, it is virtually difficult to obtain a high molecular weight polyacrylonitrile-base polymer having an intrinsic viscosity of higher than 10.0, since the spinning dope is remarkably gelled. The intrinsic viscosity of the polyacrylonitrile-base polymer can be controlled by changing the amounts of the monomer to be polymerized, initiator, chain transfer agent, etc.

It is preferred that the melting point Tm in wet heat of the polyacrylonitrile-base polymer, as measured by a differential scanning calorimeter (hereinafter may be abbreviated as DSC), is 186 to 200° C. A more preferred range is 188 to 198° C., and a further more preferred range is 190 to 195° C. If the melting point Tm in wet heat is lower than 186° C., the coalescence between single filaments becomes remarkable and, as a result, it may become difficult to enhance drawability in the stabilizing-carbonizing treatment step. Further, if the melting point Tm in wet heat is higher than 200° C., steam of higher temperature, namely, steam of higher pressure is required for steam drawing, and the high pressure breaks fibers remarkably. Therefore, as a result, productivity may decline, and the grade and mechanical properties of the obtained carbon fibers may decline.

The melting point Tm in wet heat can be controlled by the comonomer used in the mainly used polyacrylonitrile-base polymer, the copolymerized amount of it, etc. In general, the melting point Tm in wet heat tends to decline when the copolymerized amount of the comonomer is larger, and the degree of decline is different from comonomer to comonomer. It is preferred that the copolymerized amount of the comonomer is 0.5 mol % or less. More preferred is 0.4 mol % or less, and further more preferred is 0.3 mol % or less. For the purpose of expediting the stabilization reaction, it is preferred to copolymerize at least 0.1 mol % or more of a stabilization accelerator as the comonomer.

As the stabilization accelerator, for example, a compound having one or more carboxyl groups or amide groups can be preferably used. It is preferred for the purpose of enhancing productivity that the copolymerized amount of the stabilization accelerator is larger, since the stabilization reaction can be accelerated to allow the stabilization treatment to be completed in a shorter time. However, on the other hand, if the copolymerized amount of the stabilization accelerator is larger, the melting point Tm in wet heat declines and the heating rate becomes large, threatening that runaway reaction may occur. Therefore, it is preferred that the copolymerized amount is not more than 0.5 mol %. A more preferred copolymerized amount range is 0.1 to 0.4 mol %, and a further more preferred range is 0.1 to 0.3 mol %.

Particular examples of the stabilization accelerator as a comonomer include acrylic acid, methacrylic acid, itaconic acid, crotonic acid, citraconic acid, ethacrylic acid, maleic acid, mesaconic acid, acrylamide and methacrylamide. For the purpose of preventing the decline of the melting point Tm in wet heat, it is preferred to use a small amount of a monomer having a high stabilization acceleration effect, and it is preferred to use a stabilization accelerator having a carboxyl group rather than an amide group.

Further, it is more preferred that the number of the amide groups or carboxyl groups contained is two or more rather than one, and from this point of view, as the stabilization accelerator used as a comonomer, acrylic acid, methacrylic acid, itaconic acid, crotonic acid, citraconic acid, ethacrylic acid, maleic acid or mesaconic acid is preferred. Itaconic acid, maleic acid or mesaconic acid is more preferred, and above all, itaconic acid is most preferred.

For the purpose of enhancing spinnability and drawability, a comonomer other than the stabilization accelerator, such as an acrylate or methacrylate, can also be copolymerized. However, for the purpose of preventing the decline of the melting point Tm in wet heat, it is preferred that the total amount of the comonomers other than acrylonitrile is not more than 0.5 mol %. More preferred is not more than 0.4 mol %, and further more preferred is not more than 0.3 mol %.

The polymerization method used for producing the polyacrylonitrile-base polymer can be selected from publicly known polymerization methods such as solution polymerization, suspension polymerization and emulsion polymerization. For the purpose of homogeneously polymerizing comonomers, it is preferred to use solution polymerization.

As the solution used for solution polymerization, it is preferred to use a solvent capable of dissolving polyacrylonitrile, such as dimethyl sulfoxide, dimethylformamide or dimethylacetamide. Among them in view of solubility, dimethyl sulfoxide can be preferably used.

The polyacrylonitrile-base precursor fibers for production of carbon fibers can be produced by using the aforementioned polyacrylonitrile-base polymer. The polyacrylonitrile-base polymer is dissolved in a solvent capable of dissolving polyacrylonitrile, such as dimethyl sulfoxide, dimethylformamide or dimethylacetamide, to prepare a spinning dope. In the case where solution polymerization is used, if the solvent used for polymerization is the same as the solvent used for spinning (spinning solvent), the step of separating the obtained polyacrylonitrile-base polymer and re-dissolving it into a spinning solvent is not necessary.

It is highly preferred that the concentration of the polyacrylonitrile-base polymer in the spinning dope is 10 to 25 wt %. A preferred concentration range is 12 to 23 wt %, and a more preferred range is 14 to 21 wt %. If the polymer concentration is less than 10 wt %, the intermolecular entanglement in the spinning dope declines to weaken the inter-molecular connections in the radial directions of the polyacrylonitrile-base precursor fibers for production of carbon fibers, obtained by spinning, and the ability to enhance drawability in the stabilizing-carbonizing treatment step cannot be obtained. It is preferred that the polymer concentration is higher, since the aforementioned inter-molecular entanglement can be intensified, but if the concentration is higher than 25 wt %, the spinning dope is gelled remarkably, making stable spinning difficult. The polymer concentration can be controlled by adjusting the rate of the spinning solvent to the polyacrylonitrile-base polymer.

For obtaining carbon fibers having high strength, it is preferred to let the spinning dope pass through a filter having 1 µm or smaller meshes before spinning, to remove the impurities straying into the raw materials of the polyacrylonitrile-base polymer or processed materials in the respective steps of the process.

The spinning dope is extruded from a spinneret by a wet spinning method or dry wet spinning method, and introduced into a coagulation bath, to be coagulated, for forming polyacrylonitrile-base precursor fibers for production of carbon fibers. For the purpose of enhancing the denseness of the obtained polyacrylonitrile-base precursor fibers for production of carbon fibers and for the purpose of enhancing the mechanical properties of the obtained carbon fibers, a dry wet spinning method of extruding the spinning dope once into air and then introducing it into the coagulation bath is more preferred than a wet spinning method of directly extruding the spinning dope into the coagulation bath.

It is highly preferred that the linear extrusion rate for extruding the spinning dope from the spinneret is 2 to 15 m/min. A preferred linear extrusion rate range is 2 to 10 m/min, and a more preferred range is 4 to 8 m/min.

For the purpose of enhancing the drawability in the stabilizing-carbonizing treatment step of the polyacrylonitrile-base precursor fibers for production of carbon fibers, a lower linear extrusion rate is preferred. If the linear extrusion rate is higher than 15 m/min, a clear effect of enhancing the drawability in the stabilizing-carbonizing treatment step cannot be obtained. Further, if the linear extrusion rate is lowered, the stability at the time of extrusion declines, and fineness variation, fiber breakage, etc. are likely to occur. If the linear extrusion rate is lower than 2 m/min, stable spinning and drawing are difficult.

The reason why the drawability in the stabilizing-carbonizing treatment step can be enhanced by controlling the linear extrusion rate in a specific range is not clear, but is estimated to be as follows. If the linear extrusion rate is lowered, the shear rate at the extrusion holes of the spinneret at the time of extrusion declines, and it is considered that accordingly the loosening of entanglement by the shear at the time of extrusion can be inhibited. Therefore, it is considered that, if the intrinsic viscosity and the polymer concentration are controlled in the aforementioned specific ranges, the state of moderate inter-molecular entanglement is reflected as it is in the fiber structure, without being greatly changed by extrusion. It is considered that, if the fibers formed of the polyacrylonitrile-base polymer having moderate inter-molecular entanglement are used as precursor fibers, the inter-molecular and inter-crystalline connections can be developed in the stabilizing-carbonizing treatment step to enhance the drawability in the stabilizing-carbonizing treatment step.

Techniques for enhancing the processability during spinning and drawing and enhancing the tensile strength of the obtained carbon fibers by controlling the draft, namely, the ratio between the linear extrusion rate and the take-up speed in a specific range are known. However, we found that the control of the state before extrusion is more effective than the control of the state after extrusion such as the control of draft, for solving the problem of enhancing the drawability in the stabilizing-carbonizing treatment step.

If the amount of the spinning dope extruded from the spinneret is A (ml/min), the diameter of the extrusion holes of the spinneret is d (mm), and the number of extrusion holes is n, then the linear extrusion rate can be defined as follows:

$$\text{Linear extrusion rate (m/min)} = A/((d/2)^2 \times \pi \times n) \times 1{,}000.$$

Therefore, in the case where a polyacrylonitrile-base precursor fiber bundle comprising a certain number of filaments for production of carbon fibers is produced, the linear extrusion rate can be set at an arbitrary value by changing the extrusion amount and/or changing the diameter of the extrusion holes. Since the adjustment of extrusion amount may affect the single filament fineness of the obtained polyacrylonitrile-base precursor fibers for production of carbon fibers and the productivity of spinning and drawing equipment, it is more preferred to set an appropriate diameter of extrusion holes for adaptation to the necessary extrusion amount.

It is preferred that the coagulation bath used in the spinning step contains a solvent used as the solvent of the spinning dope such as dimethyl sulfoxide, dimethylformamide or dimethylacetamide, and a so-called "coagulation accelerator." As the coagulation accelerator, a compound incapable of dissolving the polyacrylonitrile-base polymer and compatible with the solvent used in the spinning dope can be used. Particularly it is preferred to use water as the coagulation accelerator.

A fiber bundle comprising numerous filaments spun from the spinneret is introduced into the coagulation bath, to coagulate the respective filaments, and the coagulated filaments undergo a water washing step, bath drawing step, oiling step, drying heat treatment step and steam drawing step, to obtain polyacrylonitrile-base precursor fibers for production of carbon fibers.

The fiber bundle derived from the coagulation bath can also be directly introduced into the bath drawing step, omitting the water washing step, or after the solvent is removed in the water washing step, the fiber bundle free from the solvent can be introduced into the bath drawing step. It is preferred that the bath drawing is performed in a single drawing bath or multiple drawing baths usually kept at a temperature of 30 to 98° C. A preferred draw ratio range is 1 to 5 times, and a more preferred range is 2 to 4.

After completion of the bath drawing step, for the purpose of preventing the coalescence between single filaments, it is preferred to apply an oil agent composed of a silicone, etc. to the fiber bundle. As the silicone oil agent, it is preferred to use a modified silicone. As the silicone oil agent, an oil agent containing an amino modified silicone with high heat resistance can be used.

It is preferred that the temperature of drying heat treatment is 160 to 200° C. A more preferred range is 165 to 198° C., and a further more preferred range is 175 to 195° C. If the temperature of drying heat treatment is lower than 160° C., the denseness of the obtained polyacrylonitrile-base precursor fibers for production of carbon fibers is insufficient, and it may be difficult to obtain the effects. Further, if the temperature of the drying heat treatment is higher than 200° C., the coalescence between single filaments is remarkable, and the tensile strength of the obtained carbon fibers may decline.

For the drying heat treatment, the fiber bundle may be allowed to run in contact with a heated roller or may also be allowed to run in a heated atmosphere, but in view of drying efficiency, it is preferred that the fiber bundle is allowed to run in contact with a heated roller.

The steam drawing is performed to draw the fiber bundle in pressure steam preferably to 3 times or more, more preferably to 4 times or more, further more preferably to 5 times or more. It is preferred that the total draw ratio in the water washing step, bath drawing step and steam drawing step as a whole is 8 to 15 times for the purpose of enhancing the mechanical properties of the obtained carbon fibers. A more preferred total draw ratio range is 10 to 14.5 times, and a further more preferred range is 11 to 14 times. If the total draw ratio is lower than 8 times, the orientation degree of the obtained polyacrylonitrile-base precursor fibers for production of carbon fibers declines, and high drawability cannot be obtained in the subsequent stabilizing-carbonizing treatment step for producing carbon fibers. Further, if the total draw ratio is higher than 15 times, the filament breakage during drawing occurs frequently, to lower the grade of the obtained polyacrylonitrile-base precursor fibers for production of carbon fibers and the obtained carbon fibers.

It is preferred that the single filament fineness of the polyacrylonitrile-base precursor fibers for production of carbon fibers is 0.7 to 1.0 dtex. If the single filament fineness is smaller than 0.7 dtex, the spinnability during spinning and drawing declines to lower the production stability, and the productivity per the number of extrusion holes declines to greatly raise the cost. On the other hand, if the single filament fineness is larger than 1.0 dtex, the structural difference between the inner and outer layers of each of the filaments forming the obtained stabilized fiber bundle becomes remarkable, and the tensile strength and the strand tensile modulus of the obtained carbon fibers may decline.

It is preferred that the number of filaments forming the polyacrylonitrile-base precursor fiber bundle for production of carbon fibers is 1,000 to 3,000,000. A more preferred range is 6,000 to 3,000,000, and a further more preferred range is 12,000 to 2,500,000. The most preferred range is 24,000 to 2,000,000. For the purpose of enhancing productivity, it is preferred that the number of filaments, which is 1,000 or larger, is as large as possible. However, if the number of filaments is larger than 3,000,000, stabilization treatment may not be able to uniformly reach inside the polyacrylonitrile-base precursor fiber bundle for production of carbon fibers.

Next, the process for producing carbon fibers is explained below.

The carbon fibers can be produced by stabilizing the polyacrylonitrile-base precursor fibers for production of carbon fibers, produced by the process for producing polyacrylonitrile-base precursor fibers for production of carbon fibers, in air having a temperature of 200 to 300° C., while drawing at a draw ratio of 0.80 to 1.20, subsequently preliminarily carbonizing in an inert atmosphere having a temperature of 300 to 800° C., while drawing at a draw ratio of 1.00 to 1.30, and carbonizing in an inert atmosphere having a temperature of 1,000 to 2,000° C., while drawing at a draw ratio of 0.96 to 1.05.

It is preferred that the draw ratio for stabilization is 0.80 to 1.20. A more preferred range is 0.90 to 1.20, and a further more preferred range is 0.85 to 1.10. If the draw ratio is lower than 0.80, the orientation degree of the obtained stabilized fibers is insufficient, and the strand tensile modulus of the obtained carbon fibers may decline. Further, if the draw ratio is higher than 1.20, the processability may decline due to fuzz generation and fiber breakage.

The stabilization treatment time can be appropriately selected in a range from 10 to 100 minutes. For the purpose of enhancing the processability of the subsequent preliminary carbonization and for the purpose of enhancing the mechanical properties of the obtained carbon fibers, it is preferred to set the time for ensuring that the specific gravity of the obtained stabilized fibers can be kept in a range from 1.3 to 1.38.

The preliminary carbonization and carbonization are performed in an inert atmosphere, and the inert gas used can be, for example, nitrogen, argon or xenon, etc. In view of economy, nitrogen can be preferably used.

It is preferred that the temperature of preliminary carbonization is 300 to 800° C., and that the temperature rising rate in the preliminary carbonization is set at 500° C./min or less.

It is preferred that the draw ratio in the preliminary carbonization is 1.00 to 1.30. A more preferred range is 1.10 to 1.30, and a further more preferred range is 1.10 to 1.20. If the draw ratio is lower than 1.00, the orientation degree of the obtained preliminarily carbonized fibers is insufficient, and the strand tensile modulus of the carbon fibers may decline. Further, if the drawing ratio is higher than 1.30, the processability may decline due to fuzz generation and fiber breakage.

It is preferred that the temperature of carbonization is 1,000 to 2,000° C. A more preferred range is 1,200 to 1,800° C., and a further more preferred range is 1,300 to 1,600° C. If the highest temperature of carbonization is higher, the strand tensile modulus is higher, but since graphitization takes place to increase the crystal size, the compressive strength may decline as a result. So, the temperature of carbonization should be set considering the balance between strand tensile modulus and compressive strength.

It is preferred that the draw ratio for carbonization is 0.96 to 1.05. A more preferred range is 0.97 to 1.05, and a further more preferred range is 0.98 to 1.03. If the draw ratio is lower than 0.96, the orientation degree and denseness of the obtained carbon fibers become insufficient, and the strand tensile modulus may decline. Further, if the draw ratio is higher than 1.05, the processability may decline due to fuzz generation and fiber breakage.

The obtained carbon fibers may also be treated by electrolysis, to be modified on the surfaces. The electrolyte used for the electrolytic treatment can be an acid solution of sulfuric acid, nitric acid or hydrochloric acid, or an aqueous solution of an alkali such as sodium hydroxide, potassium hydroxide, tetraethylammonium hydroxide, ammonium carbonate or ammonium bicarbonate or any of their salts. The quantity of electricity used for the electrolytic treatment can be selected as required in response to the carbonization degree of the applied carbon fibers.

The composite material obtained after such electrolytic treatment allows the adhesiveness between the carbon fibers and the matrix resin to be optimized for solving the problem that too strong adhesiveness causes brittle failure in the composite material and lowers the tensile strength in the fiber direction, and solving the problem that the adhesiveness to the resin is poor not allowing the strength in the non-fiber direction to be exhibited though the tensile strength in the fiber direction can be kept high. So, the obtained composite material can exhibit well-balanced strength properties in both the fiber direction and the non-fiber direction.

After completion of such electrolytic treatment, the obtained carbon fibers can be treated with a sizing agent, so that the fibers can be bundled. As the sizing agent, a sizing agent compatible with the matrix resin used in the composite material can be appropriately selected.

The carbon fibers have a high compressive strength and a high strand tensile modulus. Therefore, the carbon fibers can be applied to various molding methods such as an autoclave molding method using a prepreg, resin transfer molding method using a preform such as a woven fabric, and filament winding molding method. The carbon fibers are suitable for producing aircraft members, pressure vessel members, automobile members and sporting goods members such as fishing rods and golf shafts by using these molding methods.

The methods for measuring the respective physical values stated in this specification are as follows.

Intrinsic Viscosity

One hundred and fifty milligrams of a polyacrylonitrile-base polymer dried by heat treatment at a temperature of 120° C. for 2 hours is dissolved at a temperature of 60° C. into dimethylformamide containing 50 ml of sodium thiocyanate by 0.1 mol/liter. The dropping time of the obtained solution between gage marks is measured at an accuracy of $\frac{1}{100}$ seconds using an Ostwald viscometer at a temperature of 25° C. The measured dropping time is expressed as t (sec). Similarly, the dropping time of dimethylformamide containing sodium thiocyanate by 0.1 mol/liter but not containing the polyacrylonitrile-base polymer is also measured. The dropping time is expresses as t0 (sec). The intrinsic viscosity [η] is calculated from the following formula:

$$[\eta] = \{(1+1.32 \times \eta sp)^{(1/2)} - 1\}/0.198$$

$$\eta sp = (t/t0) - 1.$$

Meanwhile, in the examples and comparative examples described later, as the sodium thiocyanate and dimethylformamide, the guaranteed reagents produced by Wako Pure Chemical Industries, Ltd. were used.

Melting Point Tm in Wet Heat

The polyacrylonitrile-base polymer to be measured is freeze-ground in liquid nitrogen, and the ground polymer is passed through a sieve having 0.5 mm meshes, to obtain a powder of the polymer. Five milligrams of the obtained powder is accurately weighed, to prepare a sample for DSC measurement. The prepared sample is sealed in a sealable sample pan for DSC having a pressure resistance of 2 MPa or more, together with 5 mg of pure water. Then, the sample pan is used to measure DSC at a temperature rising rate of 10° C./min from room temperature to 220° C., and the temperature corresponding to the endothermic peak appearing in an approximate temperatures range from 150 to 200° C. is read as the melting point Tm (° C.) in wet heat.

Meanwhile, in the examples and comparative examples described later, as the sample pan for DSC, medium pressure pan ME29990 (pressure resistance 2 MPa) for DSC produced by Mettler was used, and as the DSC measuring instrument, DSC3100SA produced by Bruker was used.

Polyacrylonitrile-Base Polymer Concentration in Spinning Dope

About 10 g of the spinning dope to be measured is dropped into water, while its size is kept at 2 mm or less, for coagulation. The coagulated polymer is washed with running water of 80° C. for 4 hours. The washed polymer is dried by a hot air dryer at 120° C. for 2 hours. The weight of the spinning dope dropped into water is expressed as A (g), and the weight of the polymer after washing and drying is expressed as B (g). The polyacrylonitrile-base polymer concentration (%) in the spinning dope is obtained from the following formula:

$$\text{Polyacrylonitrile-base polymer concentration (\%) in spinning dope} = B/A \times 100.$$

Specific Gravity of Stabilized Fibers

The specific gravity of stabilized fibers is measured by a liquid displacement method according to the method described in JIS R 7601 (1986). As the immersion liquid, ethanol is used without being refined. One point zero to one point five grams of stabilized fibers are sampled, and dried using a hot air dryer at a temperature of 120° C. in air for 2 hours. The dry mass A (g) is measured, and the dry fibers are immersed in ethanol having a known specific gravity (specific gravity ρ), and the mass B (g) of the fibers in the ethanol is measured. The specific gravity of the stabilized fibers is obtained from the following formula:

$$\text{Specific gravity of stabilized fibers} = (A \times \rho)/(A - B).$$

Meanwhile, in the examples and comparative examples described later, as the ethanol, the guaranteed reagent produced by Wako Pure Chemical Industries, Ltd. was used.

Specific Gravity of Carbon Fibers

The specific gravity of carbon fibers is measured by a liquid displacement method according to the method described in JIS R 7601 (1986). As the immersion liquid, orthodichlorobenzene is used without being refined. One point zero to one point five grams of carbon fibers are sampled, and the weight of the carbon fibers is accurately weighed as fiber mass A (g). In succession, the carbon fibers are immersed in orthodichlorobenzene having a known specific gravity (specific gravity ρ), and the mass B (g) of the fibers in orthodichlorobenzene is measured. The specific gravity of the carbon fibers is obtained from the following formula:

$$\text{Specific gravity of carbon fibers} = (A \times \rho)/(A - B).$$

Meanwhile, in the examples and comparative examples described later, as the orthodichlorobenzene, the guaranteed reagent produced by Wako Pure Chemical Industries, Ltd. was used Strand Tensile Modulus of Carbon Fibers The strand tensile modulus of carbon fibers is obtained according to JIS R 7601 (1986) "Resin Impregnated Strand Test Methods." In this case, the resin impregnated strand of the carbon fibers to be measured is prepared by impregnating the carbon fibers with 100 parts by weight of 3,4-epoxycyclohexylmethyl-3,4-epoxy-cyclohexane-carboxylate, 3 parts by weight of boron trifluoride monomethylamine and 4 parts by weight of acetone, and heat-treating at a temperature of 130° C. for 30 minutes, for curing. Further, six strands are measured, and the arithmetic mean value of the measured values is employed as the strand tensile, modulus of the carbon fibers.

Meanwhile, in the examples and comparative examples described later, as the 3,4-epoxycyclohexylmethyl-3,4-epoxy-cyclohexane-carboxylate, "BAKELITE"® ERL4221 produced by Union Carbide was used.

Conduction Electron Density of Carbon Fibers by ESR

The carbon fibers to be determined are accurately weighed, and an ESR instrument is used to determine the signal of near g=2.002 at the respective temperatures shown in the following conditions:

Center field: Near 3377 G
Sweep width: 200 G
Modulation: 100 kHz, 2 G
Microwave: 9.46 GHz, 1 mW
Sweep time: 83.886 seconds×4 times
Time constant: 327.68 ms
Number of data points: 1024
Measuring temperatures: 10, 50, 100, 150, 200, 250 and 296 K.

The spectrum of the obtained differential curve is integrated twice to calculate the signal intensity. The signal intensity is converted into the number of spins per weight, using a standard sample having a known number of spins per weight (for example, an ion implanted polyethylene film, the number of spins of which is determined using copper sulfate pentahydrate as a standard sample). With the obtained number of spins per weight at each temperature as y and the inverse number of the absolute temperature of the measuring temperature as x, coefficients a and b are obtained base on the linear formula of y=ax+b by the least square method, and the coefficient b as the number of spins is employed as the conduction electron density (spins/g).

Meanwhile, in the examples and comparative examples described later, ESR Instrument ESP350E produced by Bruker was used as the ESR instrument.

Crystal Size of Carbon Fibers

The carbon fibers to be determined are aligned and fixed using collodion alcohol solution, to prepare a square pole test sample having a height of 4 cm and each side length of 1 mm. The prepared test sample is determined using a wide angle X-ray diffractometer under the following conditions:

X ray source: CuKα ray (tube voltage 40 kV, tube current 30 mA)
Detector: Goniometer+Monochrometer+Scintillation counter
Scanning range: 2θ=10 to 40°
Scanning mode: Step scan, step interval 0.02°, count time 2 seconds.

In the obtained diffraction pattern, the half value width of the peak appearing near 2θ=25 to 26° is obtained and, based on the value, the crystal size is calculated from the following Scherrer's formula:

$$\text{Crystal size (nm)} = K\lambda/\beta_0 \cos\theta_B$$

where K: 1.0, λ: 0.15418 nm (wavelength of X ray)
$\beta_0$: $(\beta_E^2 - \beta_1^2)^{(1/2)}$
$\beta_E$: Apparent half value width (measured value) rad
$\beta_1$: $1.046 \times 10^{-2}$ rad
$\theta_B$: Bragg diffraction angle.

Meanwhile, in the examples and comparative examples described later, XRD-6100 produced by Shimadzu Corporation was used as the wide angle X ray diffractometer.

Average Single Filament Diameter of Carbon Fibers

Of the carbon fiber bundle comprising numerous carbon filaments to be measured, the weight A (g/m) per unit length and the specific gravity B (g/cm$^3$) are obtained. With the number of filaments of the carbon fiber bundle to be measured as C, the average single filament diameter (µm) of the carbon fibers is calculated from the following formula:

$$\text{Average single filament diameter of carbon fibers (µm)} = ((A/B/C)/\pi)^{(1/2)} \times 2 \times 10^3.$$

Measurement of Composite Compressive Strength

The following raw resins are mixed and stirred for 30 minutes to obtain a resin composition:

Bisphenol A diglycidyl ether resin: 30 wt %
Bisphenol A diglycidyl ether resin: 30 wt %
Phenol novolak polyglycidyl ether resin: 27 wt %
Polyvinyl formal resin: 5 wt %
Dicyandiamide: 4 wt %
3-(3,4-dichlorophenyl)-1,1-dimethylurea: 4 wt %.

Next, a release paper sheet coated with silicone is coated on the silicone surface with the obtained resin composition, to prepare a resin film. The prepared resin film is wound around the surface of a steel drum having a circumference of about 2.7 m and controlled in a temperature range from 60 to 70° C. with the resin composition surface kept outside.

Then, a carbon fiber bundle unwound from a creel is traversed on the surface of the resin composition wound around the steel drum, for arrangement. Further, it is covered with another identical resin film with the resin composition surface kept downward, and a roll prearranged separately is kept in rolling pressure contact with the surface of the outside resin film, for impregnating the resin into the fiber bundle, to prepare a unidirectional prepreg having a width of 300 mm and a length of 2.7 m. The fiber areal weight of the prepreg is adjusted to be 190 to 200 g/m$^2$ by changing the rotational speed of the drum and the traverse feed rate.

Multiple sheets of the obtained prepreg are laminated with the fiber directions kept in one direction, and treated at a temperature of 130° C. at a pressure of 0.3 MPa for 2 hours, to cure the resin, for forming a 1 mm thick laminated sheet (fiber reinforced composite material). From the laminated sheet, specimens having a thickness of 1±0.1 mm, a width of 12.7±0.13 mm, a length of 80±0.013 mm and a gauge portion length of 5±0.13 mm are cut out. Meanwhile, at both the ends (37.5 mm each from both the ends) of each specimen, a reinforcing sheet is fixed by an adhesive, etc. to have a gauge portion length of 5±0.13 mm.

According to ASTM D695 (1996), six specimens (n=6) are tested to measure the compressive strength values at a strain rate of 1.27 mm/min, and the obtained compressive strength values are converted into those of a fiber volume fraction of 60%. The mean value is employed as the composite compressive strength.

Meanwhile, in the examples and comparative examples described later, "Epikote" ® 1001 produced by Japan Epoxy Resins Co., Ltd. was used as the bisphenol A diglycidyl ether resin, "Epikote"® 828 produced by Japan Epoxy Resins Co., Ltd., as the bisphenol A diglycidyl ether resin, "Epiclon"®-N740 produced by Dainippon Ink and Chemicals, Inc., as the phenol novolak polyglycidyl ether resin, "Vinylec"® K produced by Chisso Corporation, as the polyvinyl formal resin, DICY7 produced by Japan Epoxy Resins Co., Ltd. as the dicyandiamide, and DCMU-99 (curing agent) produced by Hodogaya Chemical Co., Ltd.), as the 3-(3,4-dichlorophenyl)-1,1-dimethylurea.

Examples 1 to 8 and Comparative Example 1 to 8 described below used the respective conditions of the respective examples and the respective comparative examples stated in Tables 1 and 2 based on the method described in the following comprehensive example.

Comprehensive Example

Acrylonitrile and the copolymerized amount (mol %) of the comonomer shown in Table 1 were copolymerized by radical polymerization using dimethyl sulfoxide as a solvent and an azo-base compound as an initiator, to produce a polyacrylonitrile-base copolymer having an intrinsic viscosity shown in Table 1 (hereinafter may be merely called a polyacrylonitrile-base copolymer). The melting point Tm (° C.) in wet heat of the produced polyacrylonitrile-base polymer was measured. The measured result is shown in Table 1.

The polymer concentration was adjusted to ensure that the polymer concentration (wt %) of the obtained polyacrylonitrile-base polymer in the spinning dope prepared described below might achieve the value shown in Table 1, and subsequently ammonia gas was blown in to neutralize itaconic acid and to introduce ammonium groups into the polyacrylonitrile-base copolymer, till the pH became 8.5, for preparing the spinning dope.

The obtained spinning dope was passed through a filter having 0.5 μm meshes, and with the temperature of the spinning dope kept at 40° C., the spinning dope was extruded once into air from a spinneret having 6,000 extrusion holes, being allowed to pass through air of about 3 mm, and it was introduced into a coagulation bath comprising 20 wt % dimethyl sulfoxide aqueous solution controlled at a temperature of 3° C., to produce a coagulated fiber bundle. In this case, the extrusion amount of the spinning dope was set to achieve the linear extrusion rate (m/min) shown in Table 1. The obtained fiber bundle was washed with water according to a conventional method and drawn in hot water to 3.5 times, and had an amino modified silicone oil deposited on it.

The obtained drawn fiber bundle was run in contact with a roller heated to a temperature of 170° C., for drying heat treatment. Then, it was drawn to 3.7 times in a pressure steam with its temperature kept in a range from 150 to 190° C., to obtain polyacrylonitrile-base precursor fibers comprising 6,000 filaments drawn at a total drawn ratio of 13 times, having a single filament fineness of 0.73 dtex. The intrinsic viscosity and the melting point (° C.) in wet heat of the obtained polyacrylonitrile-base precursor fibers were measured. The measured results are shown in Table 1.

Then, four sets of the obtained polyacrylonitrile-base precursor fibers were joined to prepare a precursor fiber bundle comprising 24,000 filaments in total for production of carbon fibers. The precursor fiber bundle was treated for stabilization in air with its temperature kept in a range from 240 to 260° C. while being drawn at a draw ratio of 1.0, to obtain a stabilized fiber bundle having a specific gravity of 1.35. The obtained stabilized fiber bundle was treated for preliminary carbonization in nitrogen atmosphere with its temperature kept in a range from 300 to 700° C. while being drawn at a draw ratio of 1.15, to obtain a preliminarily carbonized fiber bundle.

The obtained preliminarily carbonized fiber bundle was drawn with the draw ratio raised from 0.960 in steps of 0.001 in nitrogen atmosphere with 1,500° C. as the highest temperature, and the highest draw ratio at which no fiber breakage occurred, namely, the critical draw ratio for carbonization shown in Table 2 was identified. At the critical draw ratio for carbonization, the preliminarily carbonized fiber bundle was treated for carbonization to obtain a carbon fiber bundle.

Example 1

The conditions stated in the row of Example 1 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Example 2

The conditions stated in the row of Example 2 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Example 3

The conditions stated in the row of Example 3 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Example 4

The conditions stated in the row of Example 4 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Example 5

The conditions stated in the row of Example 5 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Comparative Example 1

Spinning and drawing were performed as described in Example 2, except that the linear extrusion rate was 1 m/min. However, fiber breakage occurred frequently in the coagulation step, and stable spinning and drawing could not be performed.

Example 6

Spinning, drawing, stabilizing-carbonizing treatment and evaluation were performed as described in Example 2, except that the linear extrusion rate was 3 m/min. The obtained results are shown in Tables 1 and 2. It was found that when the linear extrusion rate was low, the critical draw ratio for carbonization of the preliminarily carbonized fibers obtained by spinning and stabilizing-carbonizing treatment was high, and the strand tensile modulus and the composite compressive strength of the obtained carbon fibers were also high.

Example 7

Spinning, drawing, stabilizing-carbonizing treatment and evaluation were performed as described in Example 2, except that the linear extrusion rate was 12 m/min. The obtained results are shown in Tables 1 and 2.

Comparative Example 2

Spinning, drawing, stabilizing-carbonizing treatment and evaluation were performed as described in Example 2, except that the linear extrusion rate was 16 m/min. The obtained results are shown in Tables 1 and 2. It was found that when the linear extrusion rate was high, the critical draw ratio for carbonization of the preliminarily carbonized fibers obtained by spinning and stabilizing-carbonizing treatment was low, and the strand tensile modulus and the composite compressive strength of the obtained carbon fibers were also low.

Comparative Example 3

The conditions stated in the row of Comparative Example 3 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Comparative Example 4

The conditions stated in the row of Comparative Example 4 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Comparative Example 5

The conditions stated in the row of Comparative Example 5 in Tables 1 and 2 were employed in the comprehensive example, to produce a carbon fiber bundle. The strand tensile modulus (GPa), conduction electron density (spins/g), specific gravity, average single filament diameter (μm), crystal size (nm) and composite compressive strength (MPa) of the obtained carbon fiber bundle were measured. The measured results are shown in Table 2.

Comparative Example 6

Spinning and drawing were performed as described in Comparative Example 3, except that the linear extrusion rate was 1 m/min. However, since fiber breakage occurred frequently in the coagulation step, stable spinning and drawing could not be performed.

Comparative Example 7

Spinning, drawing, stabilizing-carbonizing treatment and evaluation were performed as described in Comparative Example 3, except that the linear extrusion rate was set at 3 m/min. The obtained results are shown in Tables 1 and 2. It was found that when the intrinsic viscosity of the polyacrylonitrile-base polymer was low, the critical draw ratio for carbonization of the preliminarily carbonized fibers obtained by spinning and stabilizing-carbonizing treatment could be enhanced only slightly even if the linear extrusion rate was made low.

Comparative Example 8

Spinning, drawing, stabilizing-carbonizing treatment and evaluation were performed as described in Comparative. Example 3, except that the linear extrusion rate was 12 m/min. The obtained results are shown in Tables 1 and 2. It was found that when the intrinsic viscosity of the polyacrylonitrile-base polymer was low, the critical draw ratio for carbonization of the preliminarily carbonized fibers obtained by spinning and stabilizing-carbonizing treatment could be changed only slightly in the case where the linear extrusion rate was high.

Example 8

Spinning, drawing, stabilizing-carbonizing treatment and evaluation were performed as described in Example 2, except that the highest temperature of the carbonization step was 1,800° C. The obtained results are shown in Tables 1 and 2.

TABLE 1

|  | Comonomer and copolymerized amount (mol %) | Intrinsic viscosity | Melting point in wet heat (° C.) |
|---|---|---|---|
| Example 1 | Itaconic acid 0.4 mol | 2.5 | 191 |
| Example 2 | Itaconic acid 0.4 mol | 2.5 | 191 |
| Example 3 | Itaconic acid 0.4 mol | 3.5 | 192 |
| Example 4 | Itaconic acid 0.4 mol | 7.0 | 192 |
| Example 5 | Itaconic acid 0.4 mol Methyl acrylate 1.0 mol % | 2.5 | 184 |
| Comparative Example 1 | Itaconic acid 0.4 mol | 2.5 | 191 |
| Example 6 | Itaconic acid 0.4 mol | 2.5 | 191 |
| Example 7 | Itaconic acid 0.4 mol | 2.5 | 191 |
| Comparative Example 2 | Itaconic acid 0.4 mol | 2.5 | 191 |
| Comparative Example 3 | Itaconic acid 0.4 mol | 1.6 | 191 |
| Comparative Example 4 | Itaconic acid 0.4 mol | 1.2 | 191 |
| Comparative Example 5 | Itaconic acid 0.4 mol | 3.5 | 192 |
| Comparative Example 6 | Itaconic acid 0.4 mol | 1.6 | 191 |
| Comparative Example 7 | Itaconic acid 0.4 mol | 1.6 | 191 |
| Comparative Example 8 | Itaconic acid 0.4 mol | 1.6 | 191 |
| Example 8 | Itaconic acid 0.4 mol | 2.5 | 191 |

|  | Polymer concentration (wt %) | Liner extrusion rate (m/min) |
|---|---|---|
| Example 1 | 20 | 6 |
| Example 2 | 15 | 6 |

TABLE 1-continued

|  | | |
|---|---|---|
| Example 3 | 15 | 6 |
| Example 4 | 10 | 6 |
| Example 5 | 15 | 6 |
| Comparative Example 1 | 15 | 1 |
| Example 6 | 15 | 3 |
| Example 7 | 15 | 12 |
| Comparative Example 2 | 15 | 16 |
| Comparative Example 3 | 20 | 6 |
| Comparative Example 4 | 25 | 6 |
| Comparative Example 5 | 8 | 6 |
| Comparative Example 6 | 20 | 1 |
| Comparative Example 7 | 20 | 3 |
| Comparative Example 8 | 20 | 12 |
| Example 8 | 15 | 6 |

TABLE 2

| | Critical draw ratio for carbonization | Strand tensile modulus (GPa) | conduction electron density ($\times 10^{19}$ spins/g) | Specific gravity |
|---|---|---|---|---|
| Example 1 | 0.997 | 355 | 5.8 | 1.82 |
| Example 2 | 0.990 | 347 | 6.0 | 1.81 |
| Example 3 | 0.104 | 361 | 5.7 | 1.82 |
| Example 4 | 0.986 | 341 | 6.1 | 1.81 |
| Example 5 | 0.975 | 330 | 6.8 | 1.80 |
| Comparative Example 1 | — | — | — | — |
| Example 6 | 0.101 | 358 | 5.8 | 1.81 |
| Example 7 | 0.984 | 337 | 6.4 | 1.81 |
| Comparative Example 2 | 0.969 | 325 | 7.1 | 1.80 |
| Comparative Example 3 | 0.968 | 323 | 7.2 | 1.80 |
| Comparative Example 4 | 0.966 | 322 | 7.4 | 1.80 |
| Comparative Example 5 | 0.968 | 324 | 7.1 | 1.80 |
| Comparative Example 6 | — | — | — | — |
| Comparative Example 7 | 0.969 | 325 | 7.1 | 1.81 |
| Comparative Example 8 | 0.960 | 316 | 7.5 | 1.79 |
| Example 8 | 0.990 | 367 | 3.5 | 1.75 |

| | Average single filament diameter (μm) | Crystal size (nm) | Composite compressive strength (MPa) |
|---|---|---|---|
| Example 1 | 5.3 | 2.1 | 1780 |
| Example 2 | 5.3 | 2.0 | 1730 |
| Example 3 | 5.3 | 2.1 | 1820 |
| Example 4 | 5.4 | 2.0 | 1700 |
| Example 5 | 5.4 | 2.0 | 1630 |
| Comparative Example 1 | — | — | — |
| Example 6 | 5.3 | 2.1 | 1790 |
| Example 7 | 5.3 | 2.0 | 1680 |
| Comparative Example 2 | 5.4 | 2.0 | 1550 |
| Comparative Example 3 | 5.4 | 2.0 | 1560 |
| Comparative Example 4 | 5.4 | 2.0 | 1520 |
| Comparative Example 5 | 5.4 | 2.0 | 1560 |
| Comparative Example 6 | — | — | — |
| Comparative Example 7 | 5.4 | 2.0 | 1540 |
| Comparative Example 8 | 5.4 | 2.0 | 1480 |
| Example 8 | 5.3 | 2.3 | 1520 |

When the intrinsic viscosity of the polyacrylonitrile-base polymer was higher while the concentration of the polymer in the spinning dope was higher, the critical draw ratio for carbonization of the preliminarily carbonized fibers obtained by spinning and stabilizing-carbonizing treatment was higher, and the strand tensile modulus of the obtained carbon fibers was also higher. Further, it was found that when the conduction electron density of carbon fibers was lower, the composite compressive strength was higher even at the same crystal size. Furthermore, it was found that when the melting point in wet heat of the polyacrylonitrile-base polymer was higher, the composite compressive strength showed a better result.

INDUSTRIAL APPLICABILITY

High drawing can be performed stably in the stabilizing-carbonizing treatment step without impairing productivity and processability, and because of it, carbon fibers excellent in compressive strength and strand tensile modulus, and excellent further in tensile strength and grade can be produced at low cost.

The carbon fibers have a high compressive strength and a high strand tensile modulus. Therefore, the carbon fibers can be applied to various molding methods such as an autoclave molding method using a prepreg, resin transfer molding method using a preform such as a woven fabric, and filament winding molding method, and are suitable for producing aircraft members, pressure vessel members, automobile members and sporting goods members such as fishing rods and golf shafts by using these molding methods.

The invention claimed is:

1. Carbon fibers, having a strand tensile modulus of 330 to 380 GPa and a conduction electron density of $4.0 \times 10^{19}$ to $7.0 \times 10^{19}$ spins/g as determined by electron spin resonance, wherein a crystal size of the carbon fibers is 1.9 to 2.5 nm.

2. The carbon fibers according to claim 1, wherein a specific gravity of the carbon fibers is 1.75 to 1.85.

3. The carbon fibers according to claim 1, wherein a average single filament diameter of the carbon fibers is 4.5 to 7.5 μm.

* * * * *